(12) United States Patent
Paille et al.

(10) Patent No.: US 6,922,943 B1
(45) Date of Patent: Aug. 2, 2005

(54) VEGETABLE AND PLANT GROWING CAGE

(76) Inventors: Michel G. Paille, 6033 Old Antonia Rd., Imperial, MO (US) 63052; Robert L. Sanazaro, 4006 Royal Estates Dr., St. Louis, MO (US) 63129

( * ) Notice: Subject to any disclaimer, the term of this patent is extended or adjusted under 35 U.S.C. 154(b) by 0 days.

(21) Appl. No.: 10/391,426

(22) Filed: Mar. 18, 2003

Related U.S. Application Data

(60) Provisional application No. 60/366,283, filed on Mar. 22, 2002.

(51) Int. Cl.[7] ............................................. A01G 17/10
(52) U.S. Cl. ............................................... 47/47; 47/44
(58) Field of Search .......................... 47/44, 45, 46, 47/47; 24/569; 248/689, 27.8, 200.1, 229.1, 248/226.11, 227.3

(56) References Cited

U.S. PATENT DOCUMENTS

| | | | |
|---|---|---|---|
| 85,244 A | 12/1868 | Rowley | |
| 261,755 A * | 7/1882 | Pennell | 47/45 |
| 417,838 A | 12/1889 | Richards | |
| 1,025,311 A * | 5/1912 | Rowell | 47/47 |
| 1,902,663 A * | 3/1933 | Phillips | 47/47 |
| 1,916,305 A * | 7/1933 | Esselen | 47/47 |
| 1,976,094 A * | 10/1934 | Ritchie | 47/47 |
| 2,000,911 A * | 5/1935 | Balousek | 47/47 |
| 2,083,526 A * | 6/1937 | Rinker | 47/47 |
| 2,173,217 A * | 9/1939 | Thomsen | 47/47 |
| 2,229,527 A * | 1/1941 | Schouman | 47/47 |
| 2,577,373 A | 12/1951 | Smith | |
| 3,004,366 A * | 10/1961 | Jaspert, Jr. | 47/47 |
| 3,638,814 A * | 2/1972 | Lowery | 211/189 |
| 3,868,787 A | 3/1975 | Wong | |
| 4,503,636 A * | 3/1985 | Stuckey | 47/44 |
| 4,860,489 A | 8/1989 | Bork | |
| 5,174,060 A | 12/1992 | Glamos | |
| 5,207,758 A | 5/1993 | Royalty | |
| 5,276,996 A | 1/1994 | Lee | |
| 5,595,019 A * | 1/1997 | Foreman | 47/47 |
| 6,088,956 A * | 7/2000 | Rocka | 47/45 |
| 6,209,258 B1 * | 4/2001 | Schneider | 47/46 |
| 6,349,502 B1 | 2/2002 | Fernandez | |
| 6,367,655 B1 | 4/2002 | Haselden, Jr. | |
| 6,453,606 B1 * | 9/2002 | Shulman et al. | 47/47 |
| 6,487,816 B1 * | 12/2002 | Wolter | 47/47 |
| 6,588,147 B2 * | 7/2003 | Bayly et al. | 47/47 |

FOREIGN PATENT DOCUMENTS

FR         2578712        *  9/1986

(Continued)

Primary Examiner—Peter M. Poon
Assistant Examiner—David Parsley
(74) Attorney, Agent, or Firm—Kevin L. Klug

(57) ABSTRACT

A vegetable and plant growing cage and method of use and manufacture comprising a tapered, flexible, and lightweight helical coil which is capable of attaching to a conventional stake and which allows a gardener, farmer, or grower to alleviate the need for tying a plant during the growing season. The device allows a plant to grow within the coil and further allows the coil to support the branches, stems, fruits, and flowers of the plant. The apparatus and method of use allows for the user to non-destructively collapse or compress the helical coil into a substantially flat helicoid for storage during the non-growing season.

9 Claims, 3 Drawing Sheets

FOREIGN PATENT DOCUMENTS

| | | | |
|---|---|---|---|
| FR | 2628936 | * | 9/1989 |
| GB | 2098043 | * | 11/1982 |
| GB | 2311200 | * | 9/1997 |
| GB | 2355638 | * | 5/2001 |
| JP | 8-38323 | * | 2/1996 |
| JP | 2000-342080 | * | 12/2000 |

* cited by examiner

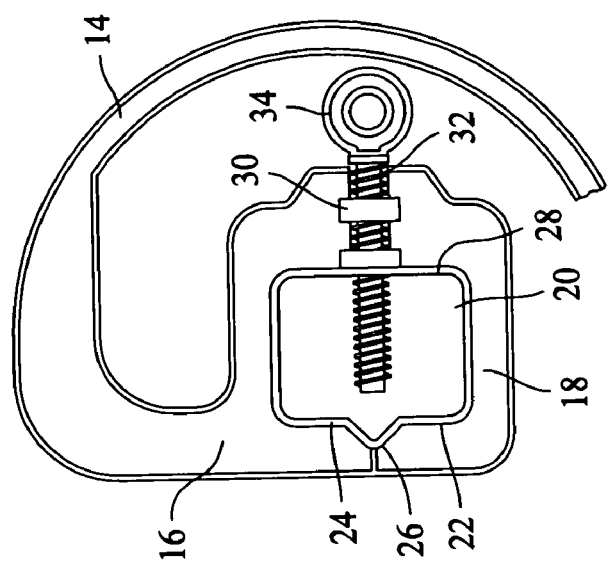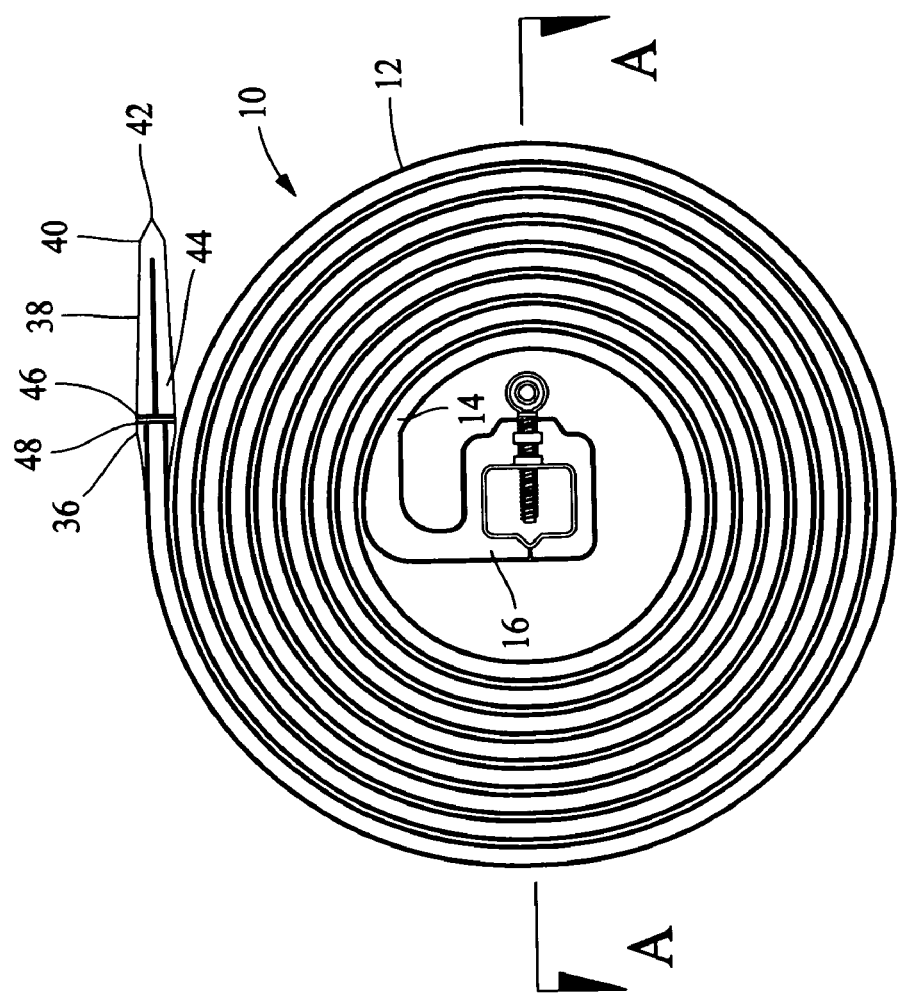

VEGETABLE AND PLANT GROWING CAGE

This application claims priority of Provisional Patent Application No. 60/366,283, filed Mar. 22, 2002.

BACKGROUND OF THE INVENTION

The present invention relates in general to a device and method for optimally growing plants and vegetables and more particularly, to a device in the form of a tapered helical coil with a unique clamp and anchor peg system which mounts over a stake and allows plants and vegetables to grow upright without tying. The device of the present art is fully adjustable to accommodate plants having heights up to or above seven feet.

It is well known within the gardening and farming arts that many plants require support during the growth, flowering, and vegetable producing periods. That is, as many plants grow, they are unable to provide self support. This phenomena is especially true with vegetable producing plants such as tomatoes, peas, and cucumbers. Traditionally, gardeners and farmers utilize a stake driven into the ground and periodically tie the plants to said stake as the plant grows. This prior art technique is very time consuming and often does not promote optimum plant growth.

Numerous plant support cages have been shown and described in the prior art with a plurality of deficiencies relative to the present art. That is, the prior art devices utilize cages, racks, or trellises which have limited adjustability for short or tall plants. The present art device provides support for plants of very short height and for plants which are greater than seven feet in height. The prior art devices also limit the strength of support for the growing plant. That is, prior art devices are generally stand alone in structure, thus unless constructed with heavy non-user friendly materials, the prior art designs cannot reliably hold growing plants without failure. The present art utilizes a central stake commonly used by growers which is secured within the earth near the growing plant to securely hold the helical spiral of the present art.

The prior art devices also do not provide a convenient and easy to use universal adjustment method to accommodate different plant sizes. Prior art devices are generally of fixed dimensions or have complex or non-convenient adjusting mechanisms. The present art provides easy one handed adjustment of the helical coil via a thumbscrew on the clamp mounted upon the central stake. Prior art devices also present a problem for off-season storage. Since the prior art devices are generally not foldable into a flat form or have other hardware portions which are non collapsible, storage generally occupies much more space than is desirable. The present art helical coil is formed from a flexible material which allows it to collapse into a flat helicoid spiral which may be stacked or placed on a wall hook. Prior art devices are often aesthetically unpleasing and further detract from the beauty of the growing plant. The preferred present art device with its unique shape and integrally molded green color allows for the plant to grow into and through it whereby the cage is difficult to distinguish from the growing plant itself.

In its preferred embodiment, the present art comprises a uniquely lightweight and flexible coil having an anchor peg at a first exterior end with a universal clamp at another second interior end along with the traditional stake utilized for plant support. The anchor peg on said exterior end is preferably integrally mounted with said flexible coil with a "living" or flexible hinge between the coil and the stake. The universal clamp on said interior end preferably comprises a housing having a threaded hole and a threaded retainer or thumbscrew within said hole. Said housing fits over said stake and is compressively held thereon by tightening the threaded retainer or thumbscrew. Preferably the device is manufactured from a molded flexible polymer such as polypropylene but may also be manufactured from a plurality of other materials which provide the flexibility desired. Alternative embodiments may utilize materials such as wood, metals and alloys thereof, plastics, leather, rubber, and composites.

Accordingly, it is an object of the present invention to provide a vegetable and plant growing cage which is capable of supporting growing plants without tying.

Another object of the present invention is to provide a method of supporting growing plants without tying.

A further object of the present invention is to provide a vegetable and plant growing cage which is able to easily and conveniently adjust to accommodate a plurality of plant heights.

A further object of the present invention is to provide a vegetable and plant growing cage which further allows for easy, convenient, and space minimizing flat storage during the non-growing season.

A still further object of the present invention is to provide a lightweight vegetable and plant growing cage having sufficient structural strength to support any vegetable or flowering plant.

SUMMARY OF THE INVENTION

To accomplish the foregoing and other objects of this invention there is provided a vegetable and plant growing cage and method of utilizing the same. The device and method provides for optimum and adjustable plant support without tying. The device and method may be utilized for a plurality of vegetables and flowering plants, including but not limited to tomatoes, peas, snow peas, cucumbers, dahlias, and morning glories. The art of the present invention is considered novel and claimed both in conjunction with and apart from the stake which is traditionally utilized for growing plants.

In its preferred form, the present invention comprises a flexible polypropylene coil of approximately 15 inches diameter with an anchor peg at a first exterior end and a universal clamp at another second interior end. Again in its preferred form, the universal clamp is attachable to a square, round, or other cross sectional shaped stake of up to 1⅝ inches in diameter. Alternative embodiments may utilize a plurality of other materials with coil diameters greater or lesser than 15 inches and clamping capability greater than 1⅝ inches. When clamped onto a conventional stake, the coil tapers from the aforesaid diameter at the base, near the base of the stake, to a smaller diameter at the top of the stake and finally terminates on the universal clamp.

The universal clamp preferably comprises a housing having a threaded hole and a threaded retainer or thumbscrew within said hole. Said housing fits over said stake and is compressively held thereon by tightening the threaded retainer or thumbscrew. The housing in its preferred form has a substantially rectangular opening through which said stake fits but may be elliptical or any polygonal shape in alternative embodiments. In its preferred form, said opening has a bearing plate of approximately 1½ inches height on a first interior wall and said threaded hole on a second interior wall opposite said bearing plate. Said bearing plate preferably contains a "V"-shaped seat or channel substantially perpendicular with the plane of said opening. Said "V"-shape provides a seat or holding channel for the stake onto which the apparatus is attached when said threaded retainer or thumbscrew is tightened. Alternative embodiments may utilize bearing plates of different shapes, sizes, and with or without said "V"-shaped channel or forego use of the bearing plate altogether without departing from the scope and spirit of the present invention.

The threaded retainer or thumbscrew, via mating with said threaded hole, provides the force to hold said clamp onto to the stake. The aforesaid holding function may be achieved with a plurality of other mechanisms such as clamps, pins, screws, adhesives, or frictional fits. The threaded retainer preferably has a head which is sized for easy rotation when attaching the universal clamp.

The anchor peg at the first exterior end preferably comprises a substantially pointed first end and a second end of said anchor peg attached via a flexible or, as known in the industry, a "living" hinge. The aforesaid hinge allows the anchor to be placed into the ground while not bending the coil of the device. In a preferred embodiment, near said hinge and near the second end of said anchor peg is a peg stop which limits the distance which the anchor peg may be pushed into the ground and provides a tab for driving said peg. Preferably said anchor peg is integrally molded with the plant growing cage and the universal clamp, but alternative embodiments may utilize clamps and pegs which are molded or formed separately and attached with said cage. Further alternative embodiments may not utilize said point on the first end or the peg stop on said second end.

In operation, a user simply drives a conventional stake into the ground next to the plant which requires support. The user then places the vegetable and plant growing cage over the stake and places the opening of the housing of the universal clamp over the top of the stake. The user then secures the universal clamp to the stake via the retainer or thumbscrew. Thereafter the user expands the coil toward the ground and drives the anchor peg into the ground to secure the base of the cage. Once the aforesaid is completed, the user simply waters and fertilizes the plant as usual and the plant grows within said vegetable and plant growing cage. As the plant grows, the branches and shoots of the plant grow through the openings between the helical coils and the coils thereby support said branches and shoots. No further tying or attachment is required during the growing season.

Upon completion of the growing season, the user loosens the universal clamp, removes the anchor peg from the ground, and easily collapses the vegetable and plant growing cage into a flat coiled helicoid form. Obviously, the user would also remove the stake and expired plant. Once collapsed into a flat helicoid form, the user may store the vegetable and plant growing cage by stacking or hanging on a hook.

The device may be manufactured from a variety of materials and in numerous shapes and styles. The coil may be of any flexible material including but not limited to plastics, metals, woods, cloths, leathers, or papers but is polypropylene in the preferred embodiment. The universal clamp and anchor peg may also be manufactured from a variety of materials including but not limited to plastics, leathers, woods, or metals but is also polypropylene in the preferred embodiment. The universal clamp and anchor peg are preferably of sufficient rigidity to hold the top and bottom of the vegetable and plant growing cage to the stake and ground respectively.

BRIEF DESCRIPTION OF THE DRAWINGS

Numerous other objects, features and advantages of the invention should now become apparent upon a reading of the following detailed description taken in conjunction with the accompanying drawings, in which:

FIG. 3 is a top plan view of the vegetable and plant growing cage of the present invention in a collapsed flat form which is ready for storage.

FIG. 4 is a top plan view of the universal clamp of the vegetable and plant growing cage.

DETAILED DESCRIPTION

Figure 2:
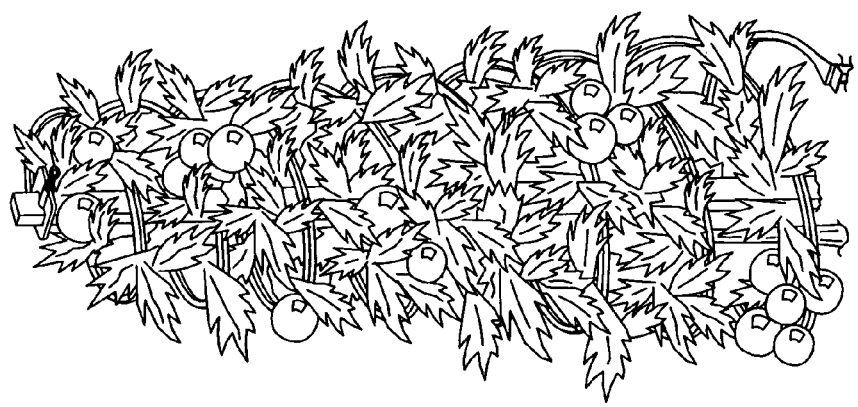
FIG. 2 is a perspective view of the vegetable and plant growing cage assembled with a conventional stake and also showing a plant and soil base.
Figure 1:
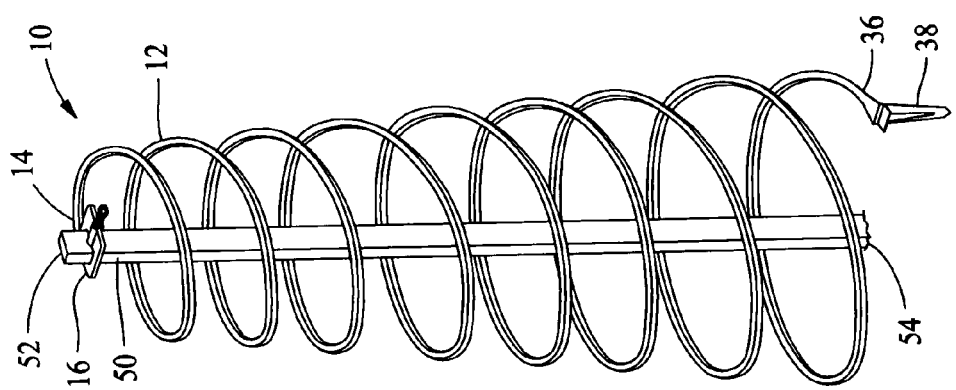
FIG. 1 is a perspective view of the vegetable and plant growing cage assembled with a conventional stake with no plant or soil shown.
Figure 5:
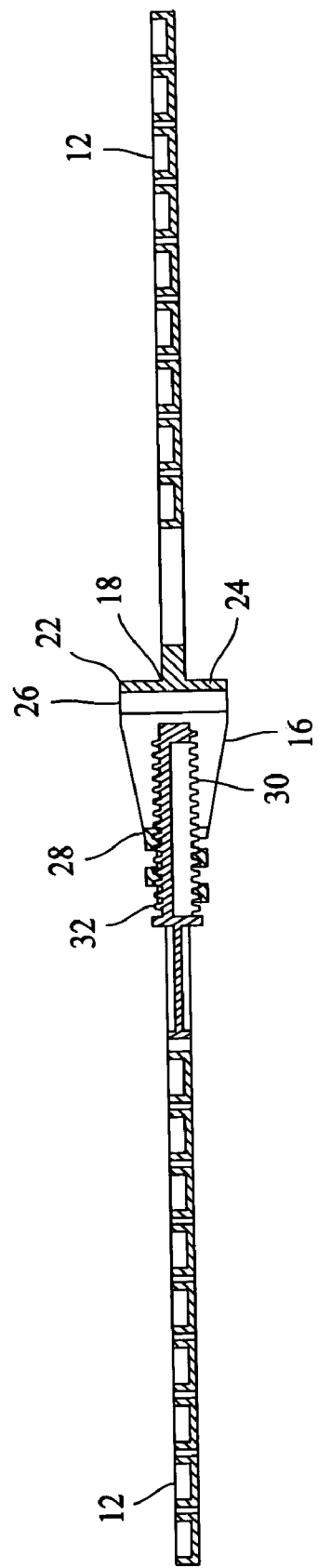
FIG. 5 is a cross sectional view taken along lines A-A' of FIG. 3 showing the coil, universal clamp, threaded hole, and threaded retainer or thumbscrew.

Referring now to the drawings, there is shown in FIGS. 1–5 the vegetable and plant growing cage 10 which provides for optimum plant growth without the conventional tying requirement. The apparatus 10 is particularly adapted for supporting growing plants which cannot provide self support including but not limited to peas, tomatoes, snow peas, cucumbers, dahlias, and morning glories. The apparatus 10 provides easy, convenient, and effective use and storage for the aforesaid applications.

The drawings show the apparatus 10 comprising, in a preferred embodiment, a flexible polypropylene coil 12 of approximately 15 inches diameter with an anchor peg 38 at a first exterior end 36 and a universal clamp 16 at another second interior end 14. Again in its preferred form, the universal clamp 16 is attachable to a square, round, or other cross sectional shaped stake 50 of up to 1⅝ inches in diameter. Alternative embodiments may utilize a plurality of other materials with coil 12 diameters greater or lesser than 15 inches and clamping capability greater than 1⅝ inches. When clamped onto a conventional stake 50, the coil 12 tapers from the aforesaid diameter at the stake base 54, to a smaller diameter at the top 52 of the stake 50 and finally terminates on the universal clamp 16. In its flattened and unconnected form, the coil 12 spirals as a helicoid inward from the aforesaid diameter toward the universal clamp 16 located near the center of said spiral.

The universal clamp 16 preferably comprises a housing 18 having a threaded hole 30 and a threaded retainer 32 or thumbscrew within said hole 30. Said housing 18 fits over said stake 50 and is compressively held thereon by tightening the threaded retainer 32 or thumbscrew. The housing 18 in its preferred form has a substantially rectangular opening 20 through which said stake 50 fits but may be elliptical or any polygonal shape in alternative embodiments. In its preferred form, said opening 20 has a bearing plate 24 of approximately 1½ inches height on a first interior wall 22 and said threaded hole 30 on a second interior wall 28 opposite said bearing plate 24. Said bearing plate 24 preferably contains a "V"-shaped cross-section seat 26 or channel substantially lengthwise perpendicular with the plane of said opening 20. Said "V"-shape provides a seat 26 or holding channel for the stake 50 onto which the apparatus 10 is attached when said threaded retainer 32 or thumbscrew is tightened. Alternative embodiments may utilize bearing plates 24 of different shapes, sizes, and with or without said "V"-shaped channel 26 or forego use of the bearing plate 24 altogether without departing from the scope and spirit of the present invention. Said seat 26 or channel may further be positioned at various angles relative to the plane of the opening 20 or be of "U", rectangular, or other cross sectional shapes.

The threaded retainer 32 or thumbscrew, via mating with said threaded hole 30, provides the force to hold said clamp 16 onto to the stake 50. The aforesaid holding function may be achieved with a plurality of other mechanisms such as clamps, pins, screws, adhesives, or frictional fits. The threaded retainer 32 preferably has a head 34 which is sized for easy rotation when attaching the universal clamp 16.

The anchor peg 38 at the first exterior end 36 preferably comprises a substantially pointed 42 first end 40 and a second end 44 of said anchor peg 38 attached via a flexible or, as known in the industry, a "living" hinge 48. That is, the hinge 48, coil 12, and anchor peg 38 are molded together in a preferred embodiment. The aforesaid hinge 48 allows the anchor 38 to be placed into the ground or growing medium while not bending the coil 12 of the device 10. In a preferred embodiment, near said hinge 48 and near the second end 44 of said anchor peg 38 is a peg stop 46 which limits the distance which the anchor peg 38 may be pushed into the ground and also allows for a hammer to be used to drive said peg 38 into the ground, soil, earth, or growing medium. Said peg stop 46 preferably is formed as a flat wall which is substantially perpendicular with the length axis of said peg 38 and extends from said peg 38, but may be of any geometric form which limits the peg 38 travel into the ground or provides for driving into the soil. As aforesaid, preferably said anchor peg 38 is integrally molded with the plant growing cage 10 and the universal clamp 16, but alternative embodiments may utilize clamps 16 and pegs 38 which are molded or formed separately and attached with said cage 10 or coil 12. Further alternative embodiments may not utilize said point 42 on the first end 40 or the peg stop 46 on said second end 44.

A unique aspect of a preferred embodiment of the present invention is that the aforesaid integral molding allows for all of the aforesaid components to be molded and created with one mold. That is, the coil 12, universal clamp 16, bearing plate 24, threaded hole 30, thrumbscrew 32, and anchor peg 38 are all formed together with small plastic connections or sprues between each of the aforesaid components. This unique formation allows the complete cage 10 to be removed from the mold as a substantially flat form, placed in packaging, and sold.

In operation, a user simply drives a conventional stake 50 into the ground, soil, or growing medium next to the plant which requires support. The user then simply breaks the plastic connections or sprues to separate the aforesaid components, installs the thumbscrew 32 into the threaded hole 30 and begins placement. Thereafter, the user places the vegetable and plant growing cage 10 over the stake 50 and places the opening 20 of the housing 18 of the universal clamp 16 over the top 52 of the stake 50. The user then secures the universal clamp 16 to the stake 50 via the retainer 32 or thumbscrew, thereby compressibly holding the clamp 16 to the stake 50. Thereafter the user expands the coil 12 toward the ground and drives the anchor peg 38 into the ground to secure the base of the cage 10. Once the aforesaid is completed, the user simply waters and fertilizes the plant as usual and the plant grows within said vegetable and plant growing cage 10. As the plant grows, the branches and shoots of the plant grow through the openings between the helical coils 12 and the coils 12 thereby support said branches and shoots. No further tying or attachment is required during the growing season. Although the device 10 may be manufactured in any color, the preferred green color allows for the device 10 to mask itself with the green plant leaves and stems so that the device 10 becomes inconspicuous as the plant grows.

Upon completion of the growing season, the user loosens the universal clamp 16, removes the anchor peg 38 from the ground, and easily collapses or non-destructively compresses the vegetable and plant growing cage 10 into a flat coiled form. Obviously, the user would also remove the stake 50 and expired plant. Once collapsed into a flat form, the user may store the vegetable and plant growing cage 10 by stacking or hanging upon a hook.

From the foregoing description, those skilled in the art will appreciate that all objects of the present invention are realized. An apparatus, method of use, and method of manufacture for a vegetable and plant growing cage has been shown and described. The apparatus provides convenient and lightweight plant support and off season storage at a minimum of cost.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A vegetable and plant growing cage comprising:
a substantially flexible tapered coil non-destructively compressible into a flattened helicoids coil shape and having a first exterior end and a second interior end; and a universal clamp attached onto said second interior end of said coil, said universal clamp having a housing with an opening with one or more interior walls and a retainer within said universal clamp whereby said retainer is capable of holding a stake compressively within said opening and between said retainer and said one or more walls; and said universal clamp holds onto said stake whereby said first exterior end of said coil extends toward a base of said stake when said clamp holds onto said stake, thereby allowing a plant to grow within said coil and said coil to support said plant as it grows; and said tapered coil tapers from said first exterior end to a smaller diameter at said second interior end, an anchor peg mounted onto said first exterior end of said coil, said anchor peg capable of pressing into a soil and holding said first exterior end near said coil, said housing having said opening as a substantially rectangular opening with a first interior wall and a second interior wall substantially opposite said first interior wall; and said second interior wall having a threaded hole and said retainer comprises a threaded retainer within said threaded hole, whereby said threaded retainer rotates and holds said stake compressively within said opening and between said threaded retainer and said first interior wall, a bearing plate on said first interior wall, whereby said bearing plate bears against said stake, thereby providing a more secure clamping action, and a substantially v-shaped cross-section channel within said bearing plate substantially perpendicular with a plane of said opening and capable of forming a seat with said stake.

2. The vegetable and plant growing cage as set forth in claim 1 whereby said anchor peg comprises:
   a substantially pointed first end and a second end attached at said first exterior end of said coil.

3. The vegetable and plant growing cage as set forth in claim 2 further comprising:
   a flexible living hinge connected between said first exterior end and said first end of said anchor peg, whereby said anchor peg flexes relative to said coil first exterior end.

4. The vegetable and plant growing cage as set forth in claim 1 whereby:
   said coil is manufactured from a polypropylene material.

5. The vegetable and plant growing cage as set forth in claim 1 whereby:
   said coil is substantially green in color.

6. The vegetable and plant growing cage as set forth in claim 1 whereby:
   said coil, universal clamp, and anchor peg is molded as a single piece.

7. A vegetable and plant growing cage comprising;
   a flexible tapered helical coil non-destructively compressible into a flat helicoids form having a first exterior end and a second interior end, said coil tapers from said first exterior end toward said second interior end; and
   a universal clamp attached onto said second interior end of said coil, said universal clamp comprising a housing having an opening and a threaded retainer extending into said opening and capable of holding a stake between said retainer and said housing; and
   an anchor peg attached onto said first exterior end of said coil,
   said housing having said opening as a substantially rectangular opening with a first interior wall and a second interior wall substantially opposite said first interior wall; and
   said second interior wall having a threaded hole and said threaded retainer disposed into said threaded hole, whereby said threaded retainer rotates and holds said stake compressively within said opening and between said threaded retainer and said first interior wall,
   a bearing plate on said first interior wall, whereby said bearing plate bears against said stake, thereby providing a more secure clamping action,
   and a substantially v-shaped cross-section channel within said bearing plate substantially perpendicular with a plane of said opening and capable of forming a seat with said stake.

8. The vegetable and plant growing cage as set forth in claim 7 whereby:
   a second end of said anchor peg is attached at said first exterior end with a flexible living hinge; and
   said anchor peg further comprises a substantially pointed first end.

9. The vegetable and plant growing cage as set forth in claim 7 whereby:
   said coil, universal clamp, and anchor peg is molded as a single piece.

* * * * *